US012745231B2

(12) United States Patent
Wang et al.

(10) Patent No.: US 12,745,231 B2
(45) Date of Patent: Sep. 22, 2026

(54) INTERFERENCE PROCESSING METHOD, RELATED DEVICE AND READABLE STORAGE MEDIUM

(71) Applicant: VIVO MOBILE COMMUNICATION CO., LTD., Guangdong (CN)

(72) Inventors: Huan Wang, Guangdong (CN); Jinhua Liu, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 315 days.

(21) Appl. No.: 18/431,359

(22) Filed: Feb. 2, 2024

(65) Prior Publication Data

US 2024/0179695 A1 May 30, 2024

Related U.S. Application Data

(63) Continuation of application No. PCT/CN2022/109658, filed on Aug. 2, 2022.

(30) Foreign Application Priority Data

Aug. 2, 2021 (CN) ......................... 202110881775.4

(51) Int. Cl.
*H04W 72/044* (2023.01)
*H04W 72/50* (2023.01)

(52) U.S. Cl.
CPC ......... *H04W 72/046* (2013.01); *H04W 72/50* (2023.01)

(58) Field of Classification Search
CPC ............................ H04W 72/046; H04W 72/50
See application file for complete search history.

(56) References Cited

U.S. PATENT DOCUMENTS

2020/0007194 A1* 1/2020 John Wilson ......... H04W 76/11
2020/0053680 A1* 2/2020 Abedini .................. H04L 5/003
2020/0146099 A1 5/2020 Abedini et al.

(Continued)

FOREIGN PATENT DOCUMENTS

CN 108024363 A 5/2018
CN 110972156 A 4/2020

(Continued)

OTHER PUBLICATIONS

International Search Report and Written Opinion for Application No. PCT /CN2022/109658, dated Nov. 8, 2022, 9 Pages.

(Continued)

*Primary Examiner* — Ajay Cattungal
(74) *Attorney, Agent, or Firm* — Foley & Lardner LLP

(57) ABSTRACT

An interference processing method, a related device and a readable storage medium, which belong to the field of communication technology. The interference processing method includes: performing, by a first integrated access backhaul (IAB) node, a first operation, where the first operation includes at least one of the following: measuring a target transmission signal of a second IAB node, where the target transmission signal includes at least one of the following: a downlink transmission signal and an uplink transmission signal; and sending first indication information to a second IAB node, where the first indication information is used to indicate beam usage restriction information of the second IAB node.

20 Claims, 3 Drawing Sheets

A first self-backhaul IAB node performs a first operation, where the first operation includes at least one of the following: measuring a target transmission signal of a second IAB node, where the target transmission signal includes at least one of the following: a downlink transmission signal of a distributed unit DU and an uplink transmission signal of a mobile terminal MT; and sending first indication information to a second IAB node, where the first indication information is used to indicate beam usage restriction of the second IAB node

401

(56) References Cited

U.S. PATENT DOCUMENTS

| | | | | |
|---|---|---|---|---|
| 2020/0229271 | A1* | 7/2020 | You | H04W 56/001 |
| 2020/0374735 | A1* | 11/2020 | Wei | H04L 5/0091 |
| 2021/0136690 | A1* | 5/2021 | Zhou | H04W 52/0229 |
| 2021/0144719 | A1* | 5/2021 | Choi | H04B 7/15542 |
| 2021/0144744 | A1* | 5/2021 | Zhou | H04L 5/0044 |
| 2021/0195541 | A1 | 6/2021 | Wei et al. | |
| 2021/0195674 | A1* | 6/2021 | Park | H04W 76/18 |
| 2021/0219155 | A1 | 7/2021 | Ye et al. | |
| 2021/0321297 | A1* | 10/2021 | Harada | H04W 28/0942 |
| 2021/0399861 | A1* | 12/2021 | Hao | H04L 5/0078 |
| 2022/0167254 | A1* | 5/2022 | Miao | H04L 5/0048 |
| 2024/0031044 | A1* | 1/2024 | Kim | H04L 5/0048 |
| 2024/0073936 | A1* | 2/2024 | Liu | H04W 72/53 |

FOREIGN PATENT DOCUMENTS

| | | | |
|---|---|---|---|
| CN | 111901003 | A | 11/2020 |
| CN | 112913304 | A | 6/2021 |

OTHER PUBLICATIONS

Huawei, HiSilicon "Resource multiplexing between backhaul and access for IAB duplexing enhancements" 3GPP TSG RAN WG1 Meeting #105-e, E-meeting, May 2021, R1-2104246, 13 Pages.

3GPP "3rd Generation Partnership Project; Technical Specification Group Radio Access Network; NR; Study on Integrated Access and Backhaul; (Release 16)" 3GPP TR 38.874 v16.0.0 (Dec. 2018), 2018, 111 Pages.

Partial Supplementary European Search Report to Application No. 22852165.4, dated Oct. 29, 2024, 14 Pages.

European Search Report for Application No. 22852165.4, Mailed Feb. 11, 2025, 16 pages.

Ericsson. Resource multiplexing and DC in enhanced IAB. 3GPP TSG-RAN WGI Meeting #105-e. RI-2105852. Online. May 2021. 17 pages.

AT&T. Feature Lead Summary #3 of 8.10.1. 3GPP TSG-RAN WGI #105-e. RI-2106056. Online. May 2021. 55 pages.

* cited by examiner

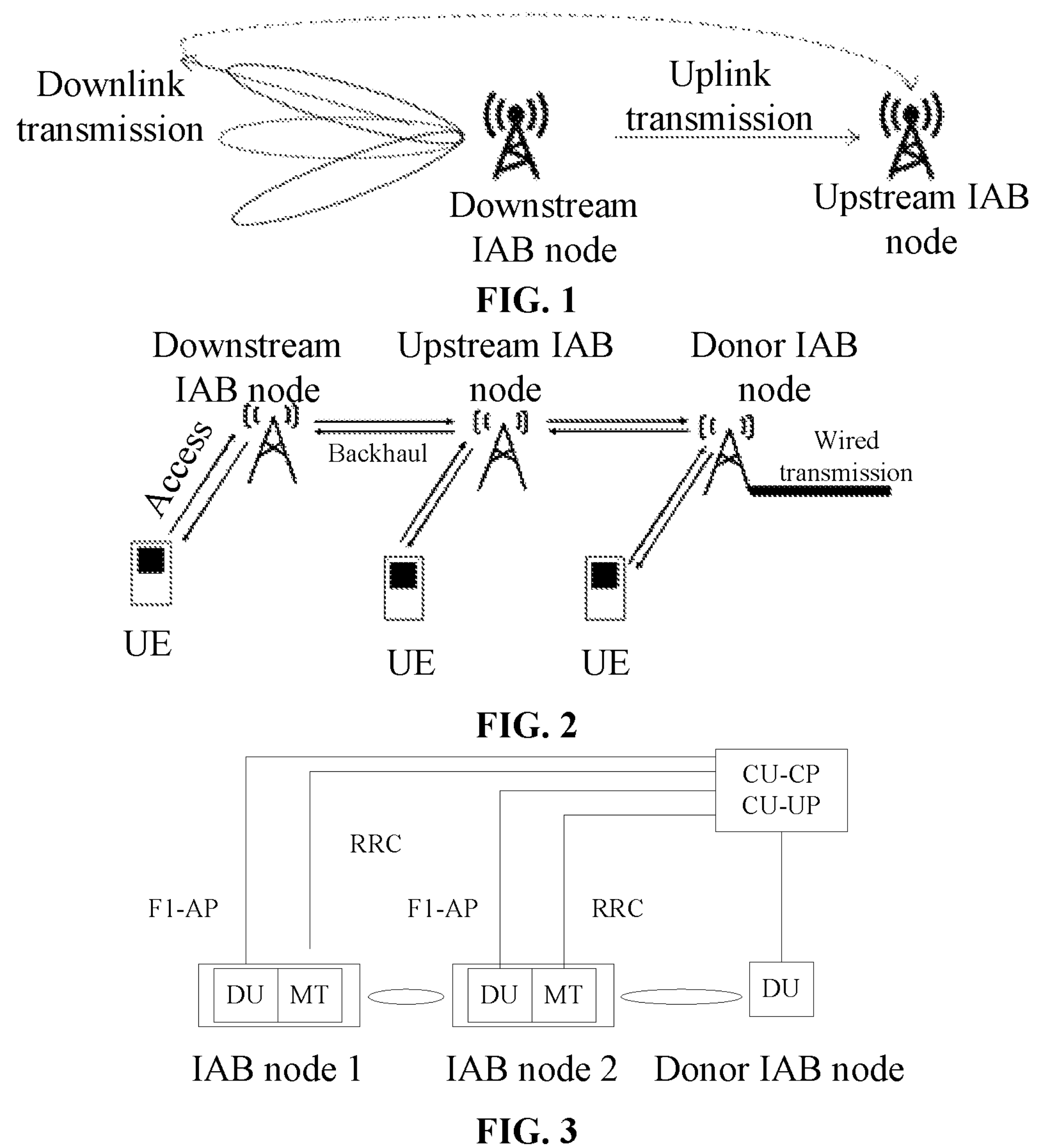

A first self-backhaul IAB node performs a first operation, where the first operation includes at least one of the following: measuring a target transmission signal of a second IAB node, where the target transmission signal includes at least one of the following: a downlink transmission signal of a distributed unit DU and an uplink transmission signal of a mobile terminal MT; and sending first indication information to a second IAB node, where the first indication information is used to indicate beam usage restriction of the second IAB node

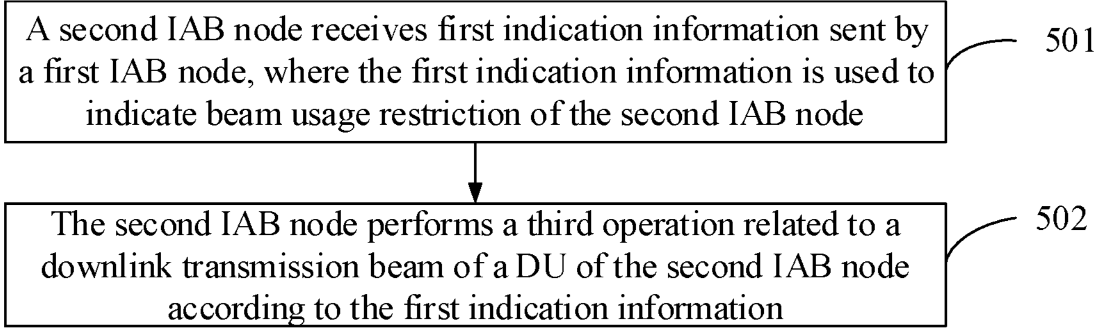
FIG. 5
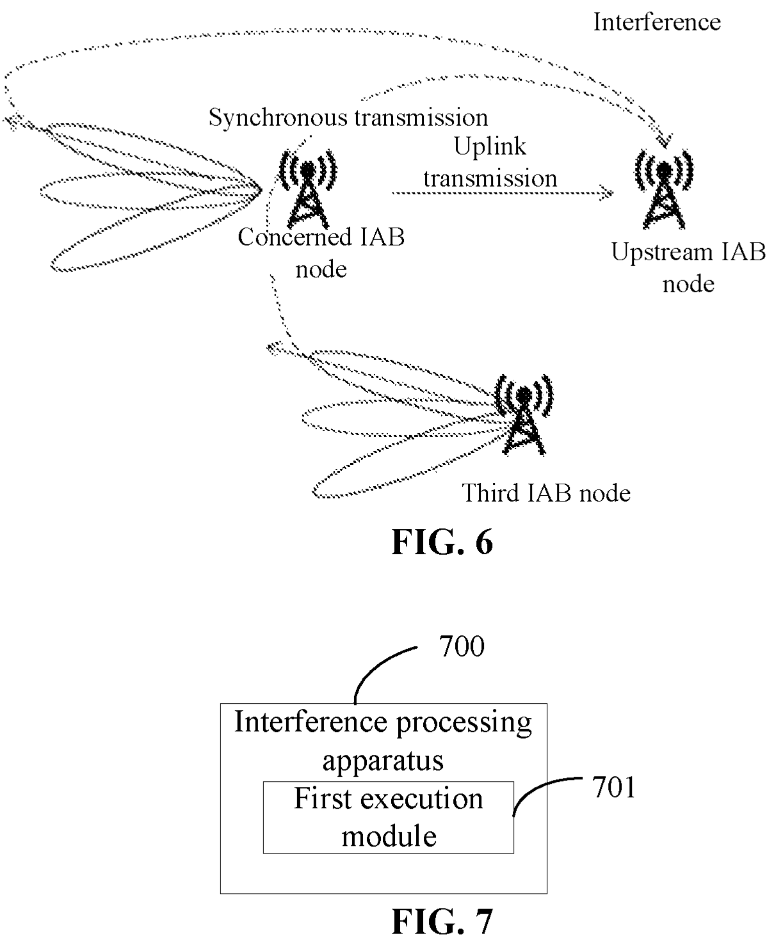
FIG. 6
FIG. 7

INTERFERENCE PROCESSING METHOD, RELATED DEVICE AND READABLE STORAGE MEDIUM

CROSS-REFERENCE TO RELATED APPLICATIONS

This application is a continuation of Application No. PCT/CN2022/109658 filed on Aug. 2, 2022, which claims priority to Chinese Patent Application No. 202110881775.4 filed on Aug. 2, 2021, which are incorporated herein by reference in their entireties.

TECHNICAL FIELD

This application belongs to the field of communication technologies, and specifically relates to an interference processing method, a related device and a readable storage medium.

BACKGROUND

In the integrated access backhaul (IAB) system, transmission of an IAB Distributed Unit (DU) and transmission of an IAB mobile termination (MT) are performed at the same time. In this case, the downlink transmission of the IAB DU will cause interference to the uplink transmission of IAB MT. However, there is currently no relevant solution for handling this interference, resulting in low reliability of information transmission.

SUMMARY

According to a first aspect, an interference processing method is provided, including:

performing, by a first integrated access backhaul IAB node, a first operation, where the first operation includes at least one of the following:

measuring a target transmission signal of a second IAB node, where the target transmission signal includes at least one of the following: a downlink transmission signal of a distributed unit DU and an uplink transmission signal of a mobile terminal MT; and sending first indication information to a second IAB node, where the first indication information is used to indicate beam usage restriction of the second IAB node.

According to a second aspect, an interference processing method is provided, including:

receiving, by a second IAB node, first indication information sent by a first IAB node, where the first indication information is used to indicate beam usage restriction of the second IAB node; and performing, by the second IAB node, a second operation related to a downlink transmission beam of a DU of the second IAB node according to the first indication information.

According to a third aspect, an interference processing apparatus is provided, including:

a first execution module, configured to perform a first operation, where the first operation includes at least one of the following:

measuring a target transmission signal of a second IAB node, where the target transmission signal includes at least one of the following: a downlink transmission signal of a distributed unit DU and an uplink transmission signal of a mobile terminal MT; and sending first indication information to a second IAB node, where the first indication information is used to indicate beam usage restriction of the second IAB node.

According to a fourth aspect, an interference processing apparatus is provided, including:

a first receiving module, configured to receive first indication information sent by a first IAB node, where the first indication information is used to indicate beam usage restriction of the second IAB node; and a second execution module, configured to perform a second operation related to a downlink transmission beam of a DU of the second IAB node according to the first indication information.

According to a fifth aspect, an IAB node is provided. The IAB node includes a processor, a memory, and a program or an instruction that is stored in the memory and that can run on the processor, where when the processor or the instruction is executed by the processor, steps of the method in the first aspect or the second aspect are implemented.

According to a sixth aspect, an IAB node is provided, including a processor and a communication interface, where:

the communication interface is configured to:

perform a first operation, where the first operation includes at least one of the following:

measuring a target transmission signal of a second IAB node, where the target transmission signal includes at least one of the following: a downlink transmission signal of a distributed unit DU and an uplink transmission signal of a mobile terminal MT; and sending first indication information to a second IAB node, where the first indication information is used to indicate beam usage restriction of the second IAB node; or the communication interface is configured to: receive first indication information sent by a first IAB node, where the first indication information is used to indicate beam usage restriction of the second IAB node; and the processor is configured to perform: a second operation related to a downlink transmission beam of a DU of the second IAB node according to the first indication information.

According to a seventh aspect, a readable storage medium is provided, where the readable storage medium stores a program or an instruction, and when the program or the instruction is executed by a processor, steps of the method according to the first aspect or the second aspect are implemented.

According to an eighth aspect, a chip is provided. The chip includes a processor and a communications interface, the communications interface is coupled to the processor, and the processor is configured to run a program or an instruction, to implement the method according to the first aspect, or the method according to the second aspect.

According to a ninth aspect, a computer program product is provided, the computer program product is stored in a non-volatile storage medium, and when the computer program product is executed by at least one processor, the method according to the first aspect, or the method according to the second aspect is performed.

According to a tenth aspect, a communication device is provided, configured to implement the method according to the first aspect or the method according to the second aspect.

BRIEF DESCRIPTION OF DRAWINGS

FIG. 1 is a first schematic diagram of an IAB system according to an embodiment of the present application;

FIG. 2 is a second schematic diagram of an IAB system according to an embodiment of the present application;

FIG. 3 is a first schematic diagram of interference according to an embodiment of the present application;

FIG. 4 is a first flowchart of an interference processing method according to an embodiment of the present application;

FIG. 5 is a flowchart of an interference processing method according to an embodiment of the present application;

FIG. 6 is a second schematic diagram of interference according to an embodiment of the present application;

FIG. 7 is a first structural diagram of an interference processing apparatus according to an embodiment of the present application;

DETAILED DESCRIPTION

Figure 8:
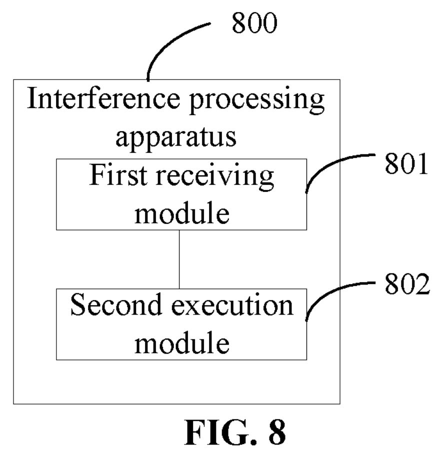
FIG. 8 is a second structural diagram of an interference processing apparatus according to an embodiment of the present application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms “first”, “second”, and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by “first” and “second” are usually of a same type, and the number of objects is not limited. For example, there may be one or more first objects. In addition, in the specification and the claims, “and/or” represents at least one of connected objects, and a character “/” generally represents an “or” relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms “system” and “network” in the embodiments of this application are often used interchangeably, and the described technology can be used not only for the systems and radio technologies mentioned above, but also for other systems and radio technologies. A new radio (NR) system is described in the following description for illustrative purposes, and the NR terminology is used in most of the following description, although these technologies can also be applied to applications other than the NR system application, such as the $6^{th}$ generation (6G) communication system.

For ease of understanding, the following describes some content in the embodiments of this application.

1. IAB System.

FIG. 1 is a schematic diagram of an IAB system according to an embodiment of the present application. As shown in FIG. 1, the IAB system may include a downstream IAB node (child IAB node) 11, an upstream IAB node (parent IAB node) 12 and a donor IAB node 13.

The donor IAB node can include a centralized unit (CU) and a DU, where the CU includes the CU control plane (CP) (CU-CP) and the CU user plane (UP) (CU-UP).

Other IAB nodes can include DU and MT.

Relying on MT, an access point, that is, a downstream IAB node, can find an upstream access point and establish a wireless connection with the DU of the upstream access point. This wireless connection is called a backhaul link. After a downstream IAB node establishes a complete backhaul link, the IAB node can turn on its DU function, and the DU will provide cell services, that is, the DU can be a terminal (also called terminal device, User Equipment (UE)) with access services. An integrated access backhaul loop contains a donor IAB node, and the donor IAB node has a directly connected wired transmission network.

In an integrated access backhaul loop, as shown in FIG. 2, the DUs and MTs of all IAB nodes are connected to the CU of the donor IAB in the integrated access backhaul loop, and the CU configures the DU based on the F1 application protocol (F1-AP), and configures the MT based on the Radio Resource Control (RRC) protocol.

The IAB system is introduced to solve the problem that no wired transmission network is deployed when access points are densely deployed. That is, when there is no wired transmission network, the access points may rely on wireless backhaul.

2. Duplexing Method of DU and MT.

In Release 16 (Rel-16), the resource multiplexing method between DU and MT is Time Division Multiplexing (TDM).

In Release 17 (Rel-17), in order to realize frequency division multiplexing (FDM) or space division multiplexing (SDM) resource multiplexing, simultaneous transmission and reception operation methods of DU and MT can be as follows:

DU transmit port (Transmit X, TX) (DU-TX)&MT transmit port (MT-TX): 1) DU is configured as Downlink (DL) TX and MT is configured as Uplink (UL) TX; 2) DU performs DL TX, and MT performs UL TX.

DU receive port (Receive X, RX) (DU-RX)&MT receive port (MT-RX): 1) DU is configured as UL RX and MT is configured as DL RX; 2) DU performs UL RX, and MT performs DL RX.

DU-TX&MT-RX: 1) DU is configured as DL TX and MT is configured as DL RX; 2) DU performs DL TX and MT performs DL RX.

DU-RX&MT-TX: 1) DU is configured as UL RX and MT is configured as TX; 2) DU performs UL RX and MT performs UL TX.

3. Interference Processing of DU-TX&MT-TX.

For the case that transmission of IAB DU and transmission of IAB MT are performed simultaneously (that is, DU-TX&MT-TX), as shown in FIG. 3, the downlink transmission of IAB DU will cause interference to the uplink transmission of IAB MT.

The interference case is at least related to the downlink beam direction of the IAB DU (that is, spatial filter). For the interference, the parent IAB can dynamically indicate a set of restricted DL beams to the child IAB node to prevent the child IAB DU from using beams that cause strong interference.

The embodiments of the present application will be described in detail below with reference to the accompanying drawings through some embodiments and their application scenarios.

FIG. 4 is a flowchart of an interference processing method provided by an embodiment of the present application. The interference processing method of FIG. 4 can be performed by a first IAB node. The first IAB node can be understood as the aforementioned upstream IAB node. In specific implementation, it may be executed by the MT and/or DU of the first IAB node.

As shown in FIG. 4, the interference processing method may include the following steps:

Step 401: A first integrated access backhaul IAB node performs a first operation.

In this embodiment of the present application, the first operation may include at least one of the following:

1) measuring a target transmission signal of a second IAB node, where the target transmission signal includes at least one of the following: a downlink transmission signal of a distributed unit DU and an uplink transmission signal of a mobile terminal MT; and
2) sending first indication information to a second IAB node, where the first indication information is used to indicate beam usage restriction information of the second IAB node.

In this embodiment of the present application, transmission of the MT and DU of the second IAB node may be performed at the same time or at different times.

In the case that transmission of the MT and DU of the second IAB node are performed simultaneously, the first IAB node may perform the first operation to reduce the interference of the downlink transmission of the DU of the second IAB node to the uplink transmission of the MT of the second IAB node.

In the case that transmission of the MT and DU of the second IAB node are not performed simultaneously, the first IAB node may perform the first operation to reduce the interference of the downlink transmission of the DU of the second IAB node to the uplink transmission of the MT of another IAB node.

For 1), the first IAB node may perform at least one of the following:

a) measuring the downlink transmission signal of the DU of the second IAB node; and
b) measuring the uplink transmission signal of the MT of the second IAB node.

a) can be used to adjust the beam for downlink transmission of the DU of the second IAB node. Optionally, the downlink transmission signal may include at least one of the following: a synchronization signal and physical broadcast channel block (Synchronization Signal and Physical Broadcast Channel (PBCH) block, SSB); and a channel state information-reference signal (CSI-RS). That is, the first IAB node may measure the SSB and/or CSI-RS of the DU of the second IAB node to adjust the downlink transmission beam of the DU of the second IAB node, so that the interference caused by the downlink transmission of the DU of the second IAB node to the uplink transmission of the IAB node can be reduced.

b) can be used to determine the uplink transmission beam of the DU of the second IAB node to adjust the downlink transmission beam of the DU of the second IAB node to be different from the uplink transmission beam of the DU of the second IAB node. That is, the first IAB node can measure the uplink signal of the MT of the second IAB node to adjust the downlink transmission beam of the DU of the second IAB node to be different from the uplink transmission beam of the DU of the second IAB node, so that interference caused by the downlink transmission of the DU of the second IAB node to the uplink transmission of the IAB node can be reduced.

2) can be used to limit the downlink transmission beam of the DU of the second IAB node, so that the interference caused by the downlink transmission of the DU of the second IAB node to the uplink transmission of the IAB node can be reduced.

It should be noted that the first operation may only include the above 1) or 2), or may include both 1) and 2). In the case that the first operation includes both 1) and 2), the beam usage restriction indicated by the first indication information is determined based on the measurement result of the target transmission signal.

In the interference processing method of the present application, the upstream IAB node may perform at least one of the following: measuring the transmission signal of the downstream IAB node; and indicating beam usage restriction information of the downstream IAB node. Through the above method, the upstream IAB node can dynamically adjust the beam used for the downlink transmission of the DU of the downstream IAB node, thereby reducing the interference caused by the downlink transmission of the IAB DU to the uplink transmission of the IAB MT, thereby improving the reliability of information transmission.

The first operation will be described in detail below.

For 1)

Optionally, in the case that the first operation includes measuring the target transmission signal of the second IAB node, the first IAB node performing the first operation including:

performing, by the first IAB node, the first operation according to a second operation; where the second operation includes at least one of the following:

operation 1: obtaining N cell identifiers corresponding to the second IAB node, where N is a positive integer;

operation 2: obtaining configuration information of the target transmission signal;

operation 3: sending first indication information, where the first indication information is used to instruct the second IAB node to send the target transmission signal at a first time domain position; and operation 4: sending second indication information, where the second indication information is used to instruct the second IAB node to stop sending the target transmission signal at a second time domain position.

It can be understood that the specific implementation manner of the first operation is related to the content of the second operation. Optionally, the first operation includes at least one of the following:

measuring target transmission signals of cells corresponding to the N cell identifiers;

measuring the target transmission signal of the second IAB node according to the configuration information;

measuring the target transmission signal of the second IAB node at the first time domain position; and giving up measuring the target transmission signal of the second IAB node at the second time domain position.

The second operation will be described in detail below.

For Operation 1

Optionally, the N cell identifiers are obtained from any one of the following: a donor IAB node and the second IAB node.

During specific implementation, the N cell identifiers (cell IDs) may be indicated by the CU of the donor IAB node or reported by the second IAB node. During the indication or reporting process, a cell ID list may be carried, and the cell ID list includes the N cell IDs; or the N cell IDs may be directly carried.

In the case that the N cell IDs are reported by the second IAB node, the N cell IDs may be reported by the MT of the second IAB node. Which cell IDs are specifically reported by the second IAB node may be agreed upon by the protocol, indicated by the first IAB node, or configured by the donor IAB node.

Optionally, in the case that the N cell identifiers are obtained from the second IAB node, the N cell identifiers may include at least one of the following:

a cell identifier corresponding to a first carrier, where the first carrier is an active carrier of the distribution unit DU of the second IAB node; and M cell identifiers one-to-one corresponding to M cells, where the M cells are M cells corresponding to the DU of the second IAB node, the M cells and a serving cell of the MT of the second IAB correspond to a same carrier, and M is a positive integer less than or equal to N.

The cell ID corresponding to the carrier can be understood as: the cell ID of the cell corresponding to the carrier. In specific implementation, the first carrier may include some or all active carriers of the DU of the second IAB node. That is, the second IAB node may report the cell IDs of the cells on some or all active carriers of the DU of the second IAB node to the first IAB node.

In the case that the N cells include M cell identifiers, the second IAB node may report the cell ID of the cell of the DU of the second IAB node that is on the same carrier as the serving cell of the MT of the second IAB node to the first IAB node.

For Operation 2

Optionally, the configuration information is obtained from any one of the following: a donor IAB node and the second IAB node.

During specific implementation, the configuration information may be indicated by the CU of the donor IAB node or reported by the second IAB node.

Optionally, the configuration information may include at least one of the following:

an index of the target transmission signal;

transmission time-frequency information of the target transmission signal; and transmission power information of the target transmission signal.

During specific implementation, the transmission time-frequency information may include at least one of the following: a transmission time-frequency position and a transmission cycle, etc. The transmission power information may include at least one of the following: transmission power; transmission power offset, etc.

For 2)

Optionally, the beam usage restriction may include at least one of the following:

c) a prohibited second beam; and d) power restriction corresponding to a second beam.

That is, the first IAB node may indicate, to the second IAB node, a beam that is prohibited and/or power restriction of using the first beam.

For c), after receiving the first indication information, the second IAB node may use a target beam to perform downlink transmission of the DU of the second IAB node, and the target beam is different from the second beam.

For d), the second beam may be any beam other than the first beam.

The power restriction corresponding to the second beam can be expressed as any one of the following:

usage power of the second beam; and power offset of the second beam.

In the case that the power restriction corresponding to the second beam is represented by the usage power of the second beam, after receiving the first indication information, the second IAB node may use the second beam to perform downlink transmission of the DU of the second IAB node, and the usage power of the second beam is the usage power of the second beam indicated by the first indication information.

When the power restriction corresponding to the second beam is represented by a power offset of the second beam, the power offset is a negative power offset used to reduce the usage power of the second beam. After receiving the first indication information, the second IAB node may use the second beam to perform downlink transmission of the DU of the second IAB node, and the usage power of the second beam may be the difference between the initial usage power of the second beam and the power offset.

Optionally, the first indication information may include N pieces of restriction information, and the N pieces of restriction information one-to-one correspond to N beam usage restrictions, and N is a positive integer.

During specific implementation, the beam usage restriction corresponding to certain restriction information can be understood as: the beam usage restriction indicated by the restriction information. In this case, the first indication information indicates N beam usage restrictions through the N pieces of restriction information. Optionally, N is a value agreed by the protocol, for example, N=1; or N is a value determined by the first IAB node; or N is a value configured by network.

The restriction information is explained below.

Implementation 1

Optionally, the restriction information may include at least one of the following:

i) first information of the DU of the second IAB node, where the first information is used to determine a restricted beam;

ii) restriction type of the restricted beam; and iii) second information related to a third beam, where the third beam is an uplink transmission beam of an MT of the second IAB node.

For i)

During specific implementation, optionally, the first information may include at least one of the following: SSB index; channel state information-reference signal resource indicator (CSI-RS Resource Indicator, CRI); and transmission configuration indicator (TCI).

Optionally, the restriction beam may include at least one of the following:

a fourth beam;

a beam that has a quasi co-location (QCL) relationship with the first information; and a beam whose lobe overlaps that of the fourth beam;

where the fourth beam is a beam indicated by the first information or a beam associated with the first information.

During implementation, the beam associated with the first information can be understood as: the beam indicated by the first information. The lobe may be a two-dimensional lobe or a three-dimensional lobe, and the embodiment of the present application does not limit the dimensions of the lobe.

Beams whose lobes overlap with the fourth beam may include at least one of the following:

a beam whose lobe overlaps with the lobe of the fourth beam; and a beam whose lobe is contained within the lobe of the fourth beam.

For ii)

Optionally, the restriction type may include at least one of the following: prohibiting usage; reducing usage power; and a recommended power offset for reduction.

When the restriction type is prohibiting usage, the IAB node prohibits the restricted beam.

When the restriction type is reducing usage power, the IAB node can use the restricted beam, but needs to reduce the usage power of the restricted beam when using the restricted beam.

In the case that the restriction type is a recommended power offset for reduction, the IAB node can use the restricted beam, but when using the restricted beam, it is necessary to reduce the usage power of the restricted beam, and the usage power of the restricted beam is equal to a difference between the initial power of the restricted beam and the recommended power offset.

For iii)

The second information is used to determine the restricted beam. Optionally, there is a quasi-co-location relationship QCL between the restricted beam and the third beam, or the restricted beam and the third beam use the same spatial filter, or the lobe of the restricted beam overlaps with that of the third beam.

The second information may be information obtained by measuring the third beam, such as a sounding reference signal resource indicator (SRI), but is not limited to this.

In the case that the restriction information includes the second information, the second IAB node may determine the third beam as the restricted beam.

Implementation 2

Optionally, the restriction information may include at least one of the following:

P pieces of identification information, where the P pieces of identification information one-to-one correspond to P restricted beams; and Q pieces of identification information, where the Q pieces of identification information one-to-one correspond to Q beam sets, and each of the Q sets includes at least one restricted beam.

During specific implementation, the restricted beam specifically included in each of the Q beam sets may be agreed by a protocol, indicated by the first IAB node, configured by the donor IAB node, or negotiated by the first IAB node and the second IAB node. Details can be determined according to the actual situation. This is not limited in the embodiments of this application.

In this optional implementation, the restriction information indicates that the beam restriction granularity may be a beam and/or a beam set.

When indicating that the beam restriction granularity is a beam set, one or more restricted beams may be indicated through a piece of identification information. In this way, the overhead of restricted beam indication may be reduced.

In practical applications, the implementation 1 and implementation 2 can be implemented independently or in combination, and the details can be determined according to actual needs, which are not limited in the embodiments of the present application.

In this embodiment of the present application, the first indication information may include one or more pieces of restriction information. For case 1 that the first indication information indicates multiple pieces of restriction information, and case 2 in which the first indication information indicates one piece of restriction information, the implementation methods may be different. Refer to the following description.

Optionally, after the first IAB node performs the first operation, the method further includes:

sending, by the first IAB node, second indication information to the second IAB node, where the second indication information is used for at least one of the following:

activating at least one piece of restriction information; and deactivating at least one piece of restriction information.

In practical applications, in an embodiment, this optional implementation can be applied to case 1 and case 2. In this embodiment, although the first indication information only indicates one piece of restriction information, the status of the restriction information can be indicated by the second indication information.

In another embodiment, this optional implementation method may only be applied to case 1, that is, optionally, when N is greater than 1, before the performing, by the second IAB node, a second operation related to a downlink transmission beam of a DU of the second IAB node according to the first indication information, the method further includes:

receiving, by the second IAB node, second indication information sent by the first IAB node, where the second indication information is used for at least one of the following:

activating at least one piece of restriction information; and deactivating at least one piece of restriction information.

In this embodiment, for case 2, optionally, when N is equal to 1, or when the protocol stipulates that N is always equal to 1, the restriction information included in the first indication information is effective restriction information. In this case, the second IAB node may determine the beam usage restriction based on the restriction information and use the beam usage restriction.

The second indication information will be described in detail below.

It can be understood that the restriction information activated by the second indication information is different from the restriction information to be deactivated. The active restriction information is the effective restriction information.

Optionally, the second indication information corresponds to K IAB nodes, the K IAB nodes include the second IAB node, and K is a positive integer. In this case, the second indication information can be used to indicate activating and/or deactivating the restriction information of the K IAB nodes, that is, the restriction information of the K IAB nodes can be activated and/or deactivated based on the same indication information, thereby saving signaling overhead.

Therefore, activating at least one piece of restriction information can be understood as activating at least one piece of restriction information of the K IAB nodes. Correspondingly, deactivating at least one piece of restriction information can be understood as: deactivating at least one piece of restriction information of the K IAB nodes.

In this embodiment of the present application, the N pieces of restriction information may be related to the receiving beam of the DU of the first IAB node. Exemplarily, each of the N pieces of restriction information may correspond to a receiving beam of the DU of the first IAB node. In this case, the first IAB node may send second indication information to the second IAB node according to the currently used receiving beam.

Of course, in some implementations, the N pieces of restriction information may not be related to the receiving beam of the DU of the first IAB node, and the specific situation may be determined according to the actual situation, which is not limited in the embodiments of this application.

The second indication information will be described in detail below.

Optionally, the second indication information includes any of the following:

activation information, where the activation information indicates restriction information to be activated;

deactivation information, where the deactivation information indicates restriction information to be deactivated; and a first sounding reference signal resource indicator SRI, where the first SRI is associated with the first restriction information.

During specific implementation, the activation information may indicate one or more pieces of restriction information to be activated. The activation information may indicate one or more pieces of restriction information to be deactivated. The first SRI may be associated with one or more pieces of restriction information.

In specific implementation, the first SRI may be the SRI of a certain uplink transmission beam of the MT of the second IAB node. The first restriction information may be one piece of restriction information among the N pieces of restriction information. In the case that the second indication information includes the first SRI, the first IAB node may activate the first restriction information, that is, the first restriction information is active restriction information.

Optionally, the second indication information can be carried through any of the following: radio resource control RRC message; media access control (MAC) control element (CE); backhaul adaptation protocol (BAP) control protocol data unit (PDU); and downlink control information (DCI).

During specific implementation, the DCI may be terminal-specific DCI (UE-specific DCI) or group common DCI.

In this embodiment of the present application, the DCI used to carry the second indication information may be scrambled with a new Radio Network Temporary Identifier (RNTI) compared to other DCIs, or may use a new format, or use an independent search space. However, in some embodiments, it can also be the same as other DCI.

The MAC CE used to carry the second indication information may use a new logical channel identifier (Logical Channel ID, LCID) compared with other MAC CEs. However, in some implementations, it can also be the same as other MAC CEs.

Optionally, the effective time of the second indication information satisfies at least one of the following:

the effective time of the second indication information is indicated by the second indication information;

a start time of the effective time of the second indication information is a first time unit, the first time unit is separated from a second time unit by M time units, the second time unit is a time unit when the IAB node receives the second indication information, and M is a positive integer; and an end time of the effective time of the second indication information is determined based on a third time unit, and the third time unit is a time unit when the IAB node receives the third indication information.

During specific implementation, in this optional implementation, the effective time of the second indication information may be explicitly indicated by the second indication information, or may be determined based on the reception time of the second indication information, and/or the reception time of the third time unit.

In the case that the start time of the effective time of the second indication information is the first time unit, M may be agreed by the protocol, configured by the donor IAB node, or indicated by the first IAB node, etc. The first time unit is located after the second time unit. In this case, the second IAB node may use the second indication information to determine the effective restriction information starting from M time units after receiving the second indication information, and use the beam usage restriction corresponding to the restriction information.

In the case that the end time of the effective time of the second indication information is determined based on the third time unit, the end time may be the third time unit or the fourth time unit. The fourth time unit is located after the third time unit, and the fourth time unit is separated from the third time unit by T time units. T is a positive integer, and T can be agreed by the protocol, configured by the donor IAB node, or indicated by the first IAB node, etc. The third indication information may be another second indication information, or may be indication information indicating cancellation of beam restriction. In this case, before the received third indication information takes effect, the second IAB node may use the beam usage restriction corresponding to the previously determined effective restriction information.

Optionally, the second indication information is not related to at least one of the following:

an SSB transmit beam;

a beam for periodic CSI-RS transmission;

a transmit beam of an RS used for radio link monitor (RLM);

a transmit beam of a system information block (SIB);

a transmit beam of a physical downlink control channel (PDCCH) in resource set 0;

a transmit beam of paging information;

a target time domain resource; and a target frequency domain resource.

During specific implementation, the second indication information being not related to X can be understood as: the second indication information is not applicable to X, that is, for X, the second indication information is not effective.

In this embodiment of the present application, the usage frequency domain range and/or the usage time domain range of the restriction information may be restricted.

Optionally, the usage frequency domain range of the restriction information can satisfy at least one of the following:

the usage frequency domain range is agreed by the protocol, configured by the donor IAB node, indicated by the first IAB node or determined by the second IAB node; and the usage frequency range includes a frequency range corresponding to a simultaneous transmission carrier of the DU of the second IAB node and the MT of the second IAB node.

During specific implementation, certain restriction information only takes effect within its usage frequency domain range; and can be ignored at other times.

Optionally, the usage time domain range of the restriction information can satisfy at least one of the following:

the usage time domain range is agreed by the protocol, configured by the donor IAB node, indicated by the first IAB node or determined by the second IAB node; and the usage time domain range includes a potential simultaneous transmission moment of the DU of the second IAB node and the MT of the second IAB node; and the usage time domain range includes the actual simultaneous transmission time of the DU of the second IAB node and the MT of the second IAB node.

During specific implementation, the indication granularity of the usage frequency domain range may be slot, sub-slot, or each time division duplex (TDD) direction within a symbol. That is, the usage frequency range may be applicable to uplink or downlink.

In the case that the usage time domain range includes the potential simultaneous transmission moment, if the second IAB node determines that the MT does not actually transmit at a certain potential simultaneous transmission moment, transmission of the DU of the second IAB node at a certain moment is not restricted by the restriction information, thereby improving resource utilization.

In the case that the usage time domain range includes the actual simultaneous transmission moment, if the second IAB node does not receive a scheduling instruction to send on a certain transmission resource before previous n time units of the resource, the transmission by the second IAB node at the moment when the resource is located is not restricted by the restriction information, thereby improving resource utilization.

FIG. 5 is a second flowchart of an interference processing method provided by an embodiment of the present application. The interference processing method in FIG. 5 is executed by the second IAB node. As shown in FIG. 5, the interference processing method may include the following steps:

Step 501: A second IAB node performs first indication information sent by a first IAB node, where the first indication information is used to indicate beam usage restriction of the second IAB node.

Step 502: The second IAB node performs a third operation related to a downlink transmission beam of a DU of the second IAB node according to the first indication information.

In the interference processing method of this embodiment, the downstream IAB node can perform the third operation related to the downlink transmission beam of the DU of the second IAB node according to the beam usage restriction indicated by the upstream IAB node. This can reduce the interference caused by the downlink transmission of the IAB DU to the uplink transmission of the IAB MT, thereby improving the reliability of information transmission.

Optionally, the beam usage restriction indicated by the first indication information include at least one of the following:

a prohibited first beam; and power restriction corresponding to a second beam.

Optionally, the third operation includes at least one of the following:

giving up using the first beam; and using the second beam according to a first transmit power, where the first transmit power is determined based on the power restriction.

Optionally, the first indication information may include N pieces of restriction information, and the N pieces of restriction information one-to-one correspond to N beam usage restrictions, and N is a positive integer.

Optionally, the restriction information includes at least one of the following:

first information of the DU of the second IAB node, where the first information is used to determine a restricted beam;

restriction type of the restricted beam; and second information of a third beam, where the third beam is an uplink transmission beam of an MT of the second IAB node.

Optionally, the first information includes at least one of the following: SSB index; channel state information-reference signal resource indicator CRI; and transmission configuration indicator TCI.

Optionally, the restricted beam includes at least one of the following:

a fourth beam;

a beam that has a quasi-co-located QCL relationship with the fourth beam; and a beam whose lobe overlaps that of the fourth beam;

where the fourth beam is a beam indicated by the first information or a beam associated with the first information.

Optionally, the restriction type may include at least one of the following: prohibiting usage; reducing usage power; and a recommended power offset for reduction.

Optionally, the restriction information includes at least one of the following:

P pieces of identification information, where the P pieces of identification information one-to-one correspond to P restricted beams; and Q pieces of identification information, where the Q pieces of identification information one-to-one correspond to Q beam sets, and each of the Q beam sets includes at least one restricted beam.

Optionally, before the performing, by the second IAB node, a third operation related to a downlink transmission beam of a DU of the second IAB node according to the first indication information, the method further includes:

receiving, by the second IAB node, second indication information sent by the first IAB node, where the second indication information is used for at least one of the following:

activating at least one piece of restriction information; and deactivating at least one piece of restriction information; and the performing, by the second IAB node, a third operation related to a downlink transmission beam of a DU of the second IAB node according to the first indication information includes:

performing, by the second IAB node, a third operation related to the downlink transmission beam of the DU of the second IAB node according to the first indication information and the second indication information.

Optionally, the second indication information corresponds to K IAB nodes, the K IAB nodes include the second IAB node, and K is a positive integer.

Optionally, the second indication information includes any of the following:

activation information, where the activation information indicates restriction information to be activated;

deactivation information, where the deactivation information indicates restriction information to be deactivated; and a first sounding reference signal resource indicator SRI, where the first SRI is associated with the first restriction information.

Optionally, the second indication information is carried through any one of the following: a radio resource control RRC message; a media access control MAC control element CE; a backhaul adaptation protocol BAP control protocol data unit PDU; and downlink control information DCI.

Optionally, the effective time of the second indication information satisfies at least one of the following:

the effective time of the second indication information is indicated by the second indication information;

a start time of the effective time of the second indication information is a first time unit, the first time unit is separated from a second time unit by M time units, the second time unit is a time unit when the IAB node receives the second indication information, and M is a positive integer; and an end time of the effective time of the second indication information is determined based on a third time unit, and the third time unit is a time unit when the IAB node receives the third indication information.

Optionally, the second indication information is not related to at least one of the following:

an SSB transmit beam;

a beam for periodic CSI-RS transmission;

a transmit beam of a reference signal (RS) used for wireless link monitoring RLM;

a transmit beam of a system information block SIB;

a transmit beam of a physical downlink control channel PDCCH in a control resource set 0;

a transmit beam of paging information;

a target time domain resource; and a target frequency domain resource.

Optionally, when N is equal to 1, the restriction information included in the first indication information is effective restriction information.

Optionally, the usage frequency domain range of the restriction information satisfies at least one of the following:

the usage frequency domain range is agreed by the protocol, configured by the donor IAB node, indicated by the first IAB node or determined by the second IAB node; and the usage frequency range includes a frequency range corresponding to a simultaneous transmission carrier of the DU of the second IAB node and the MT of the second IAB node.

Optionally, the usage time domain range of the restriction information satisfies at least one of the following:

the usage time domain range is agreed by the protocol, configured by the donor IAB node, indicated by the first IAB node or determined by the second IAB node; and the usage time domain range includes a potential simultaneous transmission moment of the DU of the second IAB node and the MT of the second IAB node; and the usage time domain range includes the actual simultaneous transmission time of the DU of the second IAB node and the MT of the second IAB node.

Optionally, in the case that the usage time domain range includes the potential simultaneous transmission moment, the method further includes:

in a case that the MT of the second IAB node does not send an uplink signal at the potential simultaneous transmission moment, sending, by the DU of the second IAB node, a downlink signal, where transmission of the downlink signal is not related to the restriction information.

Optionally, in the case that the usage time domain range includes the actual concurrent moment, the method further includes:

in a case that the MT of the second IAB node does not receive fourth indication information, sending, by the DU of the second IAB node, a downlink signal at a moment at which a first transmission resource is located, where transmission of the downlink signal is not related to the restriction information;

where the fourth indication information is used to instruct the MT of the second IAB node to send an uplink signal on the first transmission resource.

Optionally, the second IAB node receives R pieces of first indication information, the R pieces of first indication information are from R first IAB nodes, and R is an integer greater than 1; and the performing, by the second IAB node, a third operation related to a downlink transmission beam of a DU of the second IAB node according to the first indication information includes:

performing, by the second IAB node, a third operation related to a downlink transmission beam of the DU of the second IAB node according to a target beam usage restriction;

where the target beam usage restriction is any one of the following:

an intersection of beam usage restrictions indicated by the R pieces of first indication information;

a union of beam usage restrictions indicated by the R pieces of first indication information;

a beam usage restriction with the highest power restriction among beam usage restrictions indicated by the R pieces of first indication information; and a beam usage restriction indicated by target first indication information, where the target first indication information is first indication information received by a primary cell group or a secondary cell group among the R pieces of first indication information.

When the target beam usage restriction is the beam usage restriction with the highest power restriction among the beam usage restrictions indicated by the R pieces of first indication information, the highest power restriction can be understood as: the transmit power is lowest, or recommended reduced power offset is the lowest, for example:

Assuming that parent IAB node 1 indicates that beam restriction is a power reduction of 5 dB, and parent IAB node 2 indicates that beam restriction is a power reduction of 3 dB, the child IAB-DU needs to comply with the power reduction restriction of 5 dB.

In the case that the target beam usage restriction is the beam usage restriction indicated by the target first indication information, the second IAB node may follow beam usage restriction received by a master cell group (MCG) or a secondary cell group (SCG).

It should be noted that this embodiment serves as an implementation of the second IAB node corresponding to the foregoing method embodiment in FIG. 4. Therefore, reference may be made to related descriptions in the foregoing method embodiment in FIG. 4, and same beneficial effects can be achieved. To avoid repetition of description, details are not described herein again.

It should be noted that the plurality of optional implementations described in this embodiment of this application may be implemented in combination with each other or may be implemented separately. This is not limited in this embodiment of this application.

For ease of understanding, example descriptions are as follows:

Solution 1

1. Interference Measurement.

The Parent IAB node performs interference measurement on beams in all directions of the child IAB DU. A typical case is that the parent IAB node measures beams sent on downlink by the child IAB node.

Option 1: Parent IAB node measures the SSB signal sent by the child IAB node.

1) Parent IAB needs to obtain the cell ID list of the child IAB node.

The information may be indicated by the CU or reported by the child IAB node.

When the cell ID list is reported by the child IAB node to the parent IAB node, the child IAB-MT can be defined/configured to report the cell ID list of cells on all active carriers of the child IAB-DU; or the child IAB-MT can be defined/configured to report the cell ID list of a child IAB-DU on the same carrier as the serving cell of the child IAB-MT.

2) Parent IAB needs to obtain SSB configuration information, for example:

The SSB beam list includes SSB index, SSB transmission time and frequency position of the corresponding SSB index, transmission period, transmit power, SSB power offset, etc.

For example: CU configures the parent IAB node with a measurement configuration for measuring interference from child IAB-DU (for example, Synchronization Signal/Physical Broadcast Channel block (SS/PBCH block) measurement timing configuration), the parent IAB-DU/parent IAB-MT performs interference measurement on the SSB beam from the child IAB-DU according to the measurement configuration.

The information may be indicated by the CU or reported by the child IAB node.

3) Parent IAB can control the child IAB node to send SSB or stop sending an SSB occasion on a specific SSB occasion as needed. Parent IAB sends instruction signaling to achieve this purpose.

Option 2: Parent IAB node measures the CSI-RS signal sent by the child IAB node.

Parent IAB needs to obtain the cell ID (list) of the child IAB node, as described above.

The information may be indicated by the CU or reported by the child IAB node.

The Parent IAB node obtains the corresponding CSI-RS configuration/activation information, such as the CSI-RS resource index and the corresponding CSI-RS transmission time and frequency resources, offset and cycle.

The information may be indicated by the CU or reported by the child IAB node.

Parent IAB can control the child IAB node to send a CSI-RS or stop sending a CSI-RS in a specific CSI-RS resource as needed. Parent IAB sends instruction signaling to achieve this purpose.

2. Beam Restriction Indication

The Parent IAB node sends indication signaling (dynamic signaling) to the IAB node to indicate the beam usage restrictions of the IAB node. In a typical case, the parent IAB node indicates the beam restriction of downlink transmission of the IAB node.

The beam usage restriction of the IAB node includes at least one of the following: prohibiting the use of a certain beam, and having a power restriction when using a certain beam.

Parent IAB indicates that the restricted beam includes at least one of the following:

1) Indicate at least one of the SSB index/CRI (CSI-RS resource index)/TCI of the child IAB-DU.

The beam indicated by the SSB-index/CRI/TCI is a restricted beam.

Beams that have a QCL relationship with the SSB-index/CRI/TCI are all restricted beams.

The beam whose lobe (2D/3D) overlaps with that of the SSB-index/CRI/TCI is a restricted beam.

The beam whose lobe (2D/3D) is included in that of the SSB-index/CRI/TCI is a restricted beam.

2) Indicate the restriction type: prohibiting the use of a certain beam, using a certain beam with reduced power, and recommended reduced power offset.

The beam restriction indication is associated with the receiving beam of the Parent IAB DU.

1) The Parent IAB node indicates multiple sets of beam restrictions to the child IAB node, and the Parent IAB node can further activate or deactivate one/multiple sets of beam restrictions. For example, each set of beam restrictions can correspond to the receiving beam of a Parent DU, and the Parent IAB node can further activate one/multiple sets of beam restrictions based on its usage of the receive beam.

Option 1: The activation signaling can carry specific activation information, and the activation information indicates the effective beam restriction.

Option 2: Beam restriction is associated with SRI. When the parent DU indicates the SRI of a certain uplink transmission, the corresponding beam restriction is implicitly activated. In addition, the beam restriction is effective at least at the time of the uplink transmission.

2) The Parent IAB node indicates a set of effective beam restrictions to the child IAB node. For example, before the Parent DU changes the receiving beam, the beam restriction indication is updated.

The usage time and frequency range of beam restriction includes:

1) The frequency domain range is agreed by the protocol/configured by the CU/indicated by the Parent IAB node; or the IAB node independently determines the effective frequency domain range and reports it to the CU/parent IAB node.

For example, the effective frequency domain interval agreed by the protocol is the carrier on which the child IAB DU and the child IAB MT can transmit simultaneously.

2) The time domain range is the time period explicitly indicated by the parent IAB node/CU; or the child IAB node independently determines the effective time domain range and reports it to the CU/parent IAB node. For example, the indication granularity of the time period may be slot/subslot/symbol/each TDD direction within the slot.

3) The time range is the moment when child IAB node DU and MT have potential simultaneous transmission (Note: According to resource configuration/dynamic indication, child IAB DU and MT have the possibility of simultaneous transmission in the corresponding interval).

If the child IAB determines that the MT does not actually transmit on a certain potential simultaneous resource, the child IAB DU can transmit at the time of the resource without being subject to beam restrictions, so as to improve resource utilization.

4) The time range is the time when child IAB DU and MT actually transmit simultaneously, for example, the time when MT UL scheduling exists.

If the child IAB MT does not receive, before previous n time units of a certain transmission resource, a scheduling instruction to transmit on the resource, the child IAB DU can transmit at the time of the resource without being subject to beam restriction, so as to improve resource utilization.

The beam restriction indication signaling/activation signaling may be RRC, MAC CE, BAP control PDU or DCI (UE-specific DCI and/or group common DCI).

For group common DCI, the DCI contains the beam restriction/beam restriction activation indication of one/multiple IAB nodes, so that the parent IAB node can simultaneously indicate multiple child IAB nodes with less signaling overhead.

The DCI uses a new RNTI for scrambling, a new format, or an independent search space.

The MAC CE may also include the beam restriction/beam restriction activation indication of one/multiple IAB nodes, so that the parent IAB node can simultaneously indicate multiple child IAB nodes with less signaling overhead.

The MAC CE adopts the new LCID.

The effective time of the beam restriction indication signaling/activation signaling satisfies any of the following:

1) The effective time of indication signaling/activation signaling is explicitly indicated in the indication signaling/activation signaling.

2) The effective time of indication signaling/activation signaling is implicitly indicated time period:

The child IAB-DU uses the indicated beam restriction starting from M time units (slot/sub-slot/milliseconds (ms), etc.) after receiving the beam restriction indication signaling/activation signaling.

The new indication signaling (signaling indicating beam restriction/signaling indicating cancellation of beam restriction) received by the child IAB-DU shall follow the previous beam restriction before taking effect.

3) CU/Parent IAB-DU can also instruct child IAB-DU to cancel beam restriction. For example, the Parent IAB-DU may instruct the child IAB-DU to cancel the beam restriction starting from N time units (slot/sub-slot/ms, etc.) after receiving the indication signaling.

The signaling overhead of the beam restriction indication is reduced in the following manner (note: if the parent IAB node uses the indication beam restriction displayed by the PDCCH, the indication signaling overhead needs to be reduced).

The beam restriction indication is performed in the form of a restricted beam set, which is agreed in the protocol/configured/negotiated by the parent IAB node and the child IAB node. For example,

- the setting format of the beam set is indicated by the Parent IAB node/CU to the child IAB node, for example, the beams corresponding to SSB #n1~SSB #n2 are set #1, and the beams corresponding to SSB #n3~SSB #n4 are set #2 . . . , so that the IAB node can adjust the SSB beam scanning accordingly.

The Child IAB node reports the expected beam set setting form to the Parent IAB node, so that the IAB node can obtain more reasonable beam restriction instructions based on the SSB beam scanning situation.

The beam restriction indication does not apply to one/more of the following:

- an SSB transmit beam;
- a beam for periodic CSI-RS transmission;
- a transmit beam of an RS used for RLM;
- a transmit beam of SIB information;
- a transmit beam of a PDCCH in control resource set (CORESET) #0; and
- a transmit beam of paging information.

Optionally, the IAB node reports the time domain and/or frequency domain resources that are not subject to the beam restriction as expected by the node. For example, the resources occupied by some Semi-Persistent Scheduling (SPS) may not be subject to the beam restriction.

Beam Restriction Indication in Dual Link Scenario:

When a child IAB node is in dual connectivity, the Child IAB node comprehensively considers the beam restriction indications of the two parent IAB nodes to determine the restrictions on beam usage.

The beam restriction on a certain time-frequency resource is the intersection/union of the beam restrictions indicated by the two parent IAB nodes.

If the beam restriction on a certain time-frequency resource comes from two parent IAB nodes, the child IAB node follows the stricter beam restriction of beam restrictions of the two parent nodes. Parent IAB node 1 indicates that the beam restriction is power reduction of 5 dB, and parent IAB node 2 indicates that beam restriction is power reduction of 3 dB, then the child IAB DU need to comply with the power reduction restriction of 5 dB.

If the beam restriction on a certain time-frequency resource comes from two parent IAB nodes, the child IAB node follows the beam restriction received on the MCG (or SCG).

Solution 2

The Parent IAB node measures the uplink transmission of the Child IAB MT and trains the UL transmission beam of the Child IAB MT.

The Parent IAB node indicates the (potential) UL transmission beam (for example, SRI) of the Child IAB MT, which is a restricted beam.

Embodiment 1

As shown in FIG. 6, the concerned IAB node supports simultaneous transmission of IAB DU and IAB MT. At the same time, the concerned IAB MT performs uplink transmission. Before the MT uplink transmission, the parent IAB indicates the transmission beam restriction of the concerned IAB DU on the corresponding transmission resource. The parent IAB can also indicate the transmission beam restriction of the DU of the third IAB node) on the corresponding transmission resource. At the simultaneous transmission moment, the MT of a third IAB may not perform uplink transmission.

It should be noted that, for the interference processing method provided by the embodiment of the present application, the execution subject may be an interference processing apparatus, or a control module in the interference processing apparatus for executing the interference processing method. In the embodiment of the present application, the interference processing apparatus performing the interference processing method is used as an example to illustrate the interference processing apparatus provided by the embodiment of the present application.

As shown in FIG. 7, the interference processing apparatus 700 includes:

- a first execution module 701, configured to perform a first operation, where the first operation includes at least one of the following:
- measuring a target transmission signal of a second IAB node, where the target transmission signal includes at least one of the following: a downlink transmission signal of a distributed unit DU and an uplink transmission signal of a mobile terminal MT; and sending first indication information to a second IAB node, where the first indication information is used to indicate beam usage restriction of the second IAB node;

Optionally, the downlink transmission signal includes at least one of the following: synchronization signal block SSB and channel state information-reference signal CSI-RS.

Optionally, in the case that the first operation includes measuring the target transmission signal of the second IAB node, the first execution module 701 is specifically configured to:

perform the first operation according to a second operation; where the second operation includes at least one of the following:

obtaining N cell identifiers corresponding to the second IAB node, where Nis a positive integer;

obtaining configuration information of the target transmission signal;

sending first indication information, where the first indication information is used to instruct the second IAB node to send the target transmission signal at a first time domain position; and sending second indication information, where the second indication information is used to instruct the second IAB node to stop sending the target transmission signal at a second time domain position.

Optionally, the N cell identifiers are obtained from any one of the following: a donor IAB node and the second IAB node.

Optionally, in the case that the N cell identifiers are obtained from the second IAB node, the N cell identifiers may include at least one of the following:

a cell identifier corresponding to a first carrier, where the first carrier is an active carrier of the distribution unit DU of the second IAB node; and M cell identifiers one-to-one corresponding to M cells, where the M cells are M cells corresponding to the DU of the second IAB node, the M cells and a serving cell of the MT of the second IAB correspond to a same carrier, and M is a positive integer less than or equal to N.

Optionally, the configuration information is obtained from any one of the following: a donor IAB node and the second IAB node.

Optionally, the configuration information includes at least one of the following:

an index of the target transmission signal;

transmission time-frequency information of the target transmission signal; and transmission power information of the target transmission signal.

Optionally, the beam usage restriction indicated by the first indication information includes at least one of the following:

a prohibited first beam; and power restriction corresponding to a second beam.

Optionally, the first indication information may include N pieces of restriction information, and the N pieces of restriction information one-to-one correspond to N beam usage restrictions, and N is a positive integer.

Optionally, the restriction information includes at least one of the following:

first information of the DU of the second IAB node, where the first information is used to determine a restricted beam;

restriction type of the restricted beam; and second information of a third beam, where the third beam is an uplink transmission beam of an MT of the second IAB node.

Optionally, the first information includes at least one of the following: SSB index; channel state information-reference signal resource indicator CRI; and transmission configuration indicator TCI.

Optionally, the restricted beam includes at least one of the following:

a fourth beam;

a beam that has a quasi-co-located QCL relationship with the fourth beam; and a beam whose lobe overlaps that of the fourth beam;

where the fourth beam is a beam indicated by the first information or a beam associated with the first information.

Optionally, the restriction type may include at least one of the following: prohibiting usage; reducing usage power; and a recommended power offset for reduction.

Optionally, the restriction information includes at least one of the following:

P pieces of identification information, where the P pieces of identification information one-to-one correspond to P restricted beams; and Q pieces of identification information, where the Q pieces of identification information one-to-one correspond to Q beam sets, and each of the Q beam sets includes at least one restricted beam.

Optionally, the interference processing apparatus 700 also includes:

a first sending module, configured to send second indication information to the second IAB node, where the second indication information is used for at least one of the following:

activating at least one piece of restriction information; and deactivating at least one piece of restriction information.

Optionally, the second indication information corresponds to K IAB nodes, the K IAB nodes include the second IAB node, and K is a positive integer.

Optionally, the second indication information includes any one of the following:

activation information, where the activation information indicates restriction information to be activated;

deactivation information, where the deactivation information indicates restriction information to be deactivated; and a first sounding reference signal resource indicator SRI, where the first SRI is associated with the first restriction information.

Optionally, the second indication information is carried through any one of the following: a radio resource control RRC message; a media access control MAC control element CE; a backhaul adaptation protocol BAP control protocol data unit PDU; and downlink control information DCI.

Optionally, the effective time of the second indication information satisfies at least one of the following:

the effective time of the second indication information is indicated by the second indication information;

a start time of the effective time of the second indication information is a first time unit, the first time unit is separated from a second time unit by M time units, the second time unit is a time unit when the IAB node receives the second indication information, and M is a positive integer; and an end time of the effective time of the second indication information is determined based on a third time unit, and the third time unit is a time unit when the IAB node receives the third indication information.

Optionally, the second indication information is not related to at least one of the following:

an SSB transmit beam;

a beam for periodic CSI-RS transmission;

a transmit beam of an RS used for wireless link monitoring RLM;

a transmit beam of a system information block SIB;

a transmit beam of a physical downlink control channel PDCCH in a control resource set 0;

a transmit beam of paging information;

a target time domain resource; and a target frequency domain resource.

Optionally, when N is equal to 1, the restriction information included in the first indication information is effective restriction information.

Optionally, the usage frequency domain range of the restriction information satisfies at least one of the following:

the usage frequency domain range is agreed by the protocol, configured by the donor IAB node, indicated by the first IAB node or determined by the second IAB node; and the usage frequency range includes a frequency range corresponding to a simultaneous transmission carrier of the DU of the second IAB node and the MT of the second IAB node.

Optionally, the usage time domain range of the restriction information satisfies at least one of the following:

the usage time domain range is agreed by the protocol, configured by the donor IAB node, indicated by the first IAB node or determined by the second IAB node; and the usage time domain range includes a potential simultaneous transmission moment of the DU of the second IAB node and the MT of the second IAB node; and the usage time domain range includes an actual simultaneous transmission moment of the DU of the second IAB node and the MT of the second IAB node.

The interference processing apparatus in the embodiment of the present application may be an apparatus, or an apparatus or an upstream IAB node with an operating system.

The interference processing apparatus 700 according to an embodiments of the present disclosure can implement the processes in the method embodiments in FIG. 4, and achieve the same technical effect. To avoid repetition, details are not described herein again.

As shown in FIG. 8, the interference processing apparatus 800 includes:

a first receiving module 801, configured to receive first indication information sent by a first IAB node, where the first indication information is used to indicate beam usage restriction of the second IAB node; and a second execution module 802, configured to perform a third operation related to a downlink transmission beam of a DU of the second IAB node according to the first indication information.

Optionally, the beam usage restriction indicated by the first indication information includes at least one of the following:

a prohibited first beam; and power restriction corresponding to a second beam.

Optionally, the third operation includes at least one of the following:

giving up using the first beam; and using the second beam according to a first transmit power, where the first transmit power is determined based on the power restriction.

Optionally, the first indication information may include N pieces of restriction information, and the N pieces of restriction information one-to-one correspond to N beam usage restrictions, and N is a positive integer.

Optionally, the restriction information includes at least one of the following:

first information of the DU of the second IAB node, where the first information is used to determine a restricted beam;

restriction type of the restricted beam; and second information of a third beam, where the third beam is an uplink transmission beam of an MT of the second IAB node.

Optionally, the first information includes at least one of the following: SSB index; channel state information-reference signal resource indicator CRI; and transmission configuration indicator TCI.

Optionally, the restricted beam includes at least one of the following:

a fourth beam;

a beam that has a quasi-co-located QCL relationship with the fourth beam; and a beam whose lobe overlaps that of the fourth beam;

where the fourth beam is a beam indicated by the first information or a beam associated with the first information.

Optionally, the restriction type may include at least one of the following: prohibiting usage; reducing usage power; and a recommended power offset for reduction.

Optionally, the restriction information includes at least one of the following:

P pieces of identification information, where the P pieces of identification information one-to-one correspond to P restricted beams; and Q pieces of identification information, where the Q pieces of identification information one-to-one correspond to Q beam sets, and each of the Q beam sets includes at least one restricted beam.

Optionally, the interference processing apparatus 800 also includes:

a second receiving module, configured to receive second indication information sent by the first IAB node, where the second indication information is used for at least one of the following:

activating at least one piece of restriction information; and deactivating at least one piece of restriction information; and the performing, by the second IAB node, a third operation related to a downlink transmission beam of a DU of the second IAB node according to the first indication information includes:

performing, by the second IAB node, a third operation related to the downlink transmission beam of the DU of the second IAB node according to the first indication information and the second indication information.

Optionally, the second indication information corresponds to K IAB nodes, the K IAB nodes include the second IAB node, and K is a positive integer.

Optionally, the second indication information includes any one of the following:

activation information, where the activation information indicates restriction information to be activated;

deactivation information, where the deactivation information indicates restriction information to be deactivated; and a first sounding reference signal resource indicator SRI, where the first SRI is associated with the first restriction information.

Optionally, the second indication information is carried through any one of the following: a radio resource control RRC message; a media access control MAC control element CE; a backhaul adaptation protocol BAP control protocol data unit PDU; and downlink control information DCI.

Optionally, the effective time of the second indication information satisfies at least one of the following:

the effective time of the second indication information is indicated by the second indication information;

a start time of the effective time of the second indication information is a first time unit, the first time unit is separated from a second time unit by M time units, the second time unit is a time unit when the IAB node receives the second indication information, and M is a positive integer; and an end time of the effective time of the second indication information is determined based on a third time unit, and the third time unit is a time unit when the IAB node receives the third indication information.

Optionally, the second indication information is not related to at least one of the following:

an SSB transmit beam;

a beam for periodic CSI-RS transmission;

a transmit beam of an RS used for wireless link monitoring RLM;

a transmit beam of a system information block SIB;

a transmit beam of a physical downlink control channel PDCCH in a control resource set 0;

a transmit beam of paging information;

a target time domain resource; and a target frequency domain resource.

Optionally, when N is equal to 1, the restriction information included in the first indication information is effective restriction information.

Optionally, the usage frequency domain range of the restriction information satisfies at least one of the following:

the usage frequency domain range is agreed by the protocol, configured by the donor IAB node, indicated by the first IAB node or determined by the second IAB node; and the usage frequency range includes a frequency range corresponding to a simultaneous transmission carrier of the DU of the second IAB node and the MT of the second IAB node.

Optionally, the usage time domain range of the restriction information satisfies at least one of the following:

the usage time domain range is agreed by the protocol, configured by the donor IAB node, indicated by the first IAB node or determined by the second IAB node; and the usage time domain range includes a potential simultaneous transmission moment of the DU of the second IAB node and the MT of the second IAB node; and the usage time domain range includes the actual simultaneous transmission time of the DU of the second IAB node and the MT of the second IAB node.

Optionally, when the usage time domain range includes the potential simultaneous transmission moment, the interference processing apparatus 800 further includes:

a second sending module, configured to: in a case that the MT of the second IAB node does not send an uplink signal at the potential simultaneous transmission moment, send, by the DU of the second IAB node, a downlink signal, where transmission of the downlink signal is not related to the restriction information.

Optionally, when the usage time domain range includes the actual simultaneous transmission time, the interference processing apparatus 800 further includes:

a third sending module, configured to: in a case that the MT of the second IAB node does not receive fourth indication information, send, by the DU of the second IAB node, a downlink signal at a moment at which a first transmission resource is located, where transmission of the downlink signal is not related to the restriction information;

where the fourth indication information is used to instruct the MT of the second IAB node to send an uplink signal on the first transmission resource.

Optionally, the second IAB node receives R pieces of first indication information, the R pieces of first indication information are from R first IAB nodes, and R is an integer greater than 1; and the second execution module 802 is specifically configured to:

perform a third operation related to a downlink transmission beam of the DU of the second IAB node according to a target beam usage restriction;

where the target beam usage restriction is any one of the following:

an intersection of beam usage restrictions indicated by the R pieces of first indication information;

a union of beam usage restrictions indicated by the R pieces of first indication information;

a beam usage restriction with the highest power restriction among beam usage restrictions indicated by the R pieces of first indication information; and a beam usage restriction indicated by target first indication information, where the target first indication information is first indication information received by a primary cell group or a secondary cell group among the R pieces of first indication information.

The interference processing apparatus in the embodiment of the present application may be an apparatus, or an apparatus or a downstream IAB node with an operating system.

The interference processing apparatus 800 according to an embodiments of the present disclosure can implement the processes in the method embodiments in FIG. 5, and achieve the same technical effect. To avoid repetition, details are not described herein again.

Figure 9:
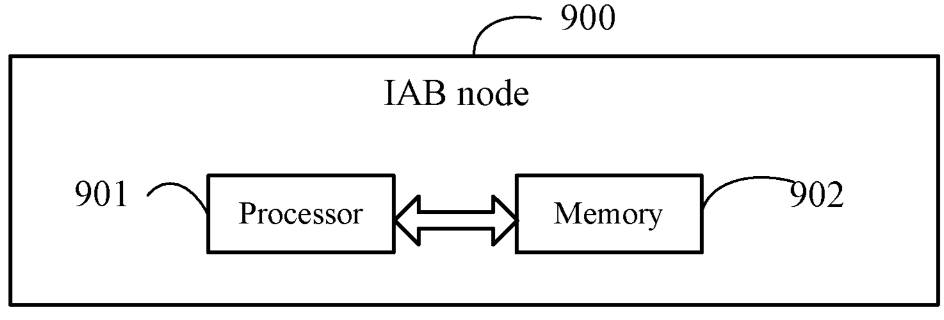
FIG. 9 is a structural diagram of an IAB node according to an embodiment of the present application.

Optionally, as shown in FIG. 9, an embodiment of the present application further provides an IAB node 900, including a processor 901, a memory 902, and a program or an instruction stored in the memory 902 and executable on the processor 901. For example, when the IAB node 900 is a first IAB node, when the program or instruction is executed by the processor 901, each process of the embodiment of the foregoing method in FIG. 4 is performed, and the same technical effect can be achieved. When the IAB node 900 is the second IAB node, when the program or instruction is executed by the processor 901, each process of the above method embodiment in FIG. 5 is implemented, and the same technical effect can be achieved. To avoid repetition, the details will not be described here.

An embodiment of the present application also provides an IAB node, including a processor and a communication interface.

The communication interface is configured to:

perform a first operation, where the first operation includes at least one of the following:

measuring a target transmission signal of a second IAB node, where the target transmission signal includes at least one of the following: a downlink transmission signal of a distributed unit DU and an uplink transmission signal of a mobile terminal MT; and sending first indication information to a second IAB node, where the first indication information is used to indicate beam usage restriction of the second IAB node;

or the communication interface is configured to: receive first indication information sent by a first IAB node, where the first indication information is used to indicate beam usage restriction of the second IAB node; and the processor is configured to perform: a second operation related to a downlink transmission beam of a DU of the second IAB node according to the first indication information.

This IAB node embodiment corresponds to the above-mentioned method embodiment in FIG. 4 or FIG. 5. Each implementation process and implementation manner of the above-mentioned method embodiment can be applied to this IAB node embodiment, and can achieve the same technical effect.

An embodiment of this application further provides a computer-readable storage medium. The computer-readable storage medium stores a computer program, and when the computer program is executed by a processor, the processes of the foregoing method embodiments shown in FIG. 4 or FIG. 5 are implemented and a same technical effect can be achieved. To avoid repetition, details are not described herein again.

The computer-readable storage medium may be a read-only memory (ROM), a random access memory (RAM), a magnetic disk, a compact disc, or the like.

An embodiment of this application further provides a readable storage medium. The readable storage medium stores a program or instructions. When the program or the instructions are executed by a processor, each process in the method embodiment in FIG. 4 or FIG. 5 is implemented, and a same technical effect is achieved. To avoid repetition, details are not described herein again.

The processor is a processor in the terminal in the foregoing embodiment. The readable storage medium includes a computer-readable storage medium, such as a computer read-only memory (ROM), a random access memory (RAM), a magnetic disk, an optical disc, or the like.

An embodiment of the present application further provides a chip, the chip includes a processor and a communication interface, the communication interface is coupled to the processor, and the processor is configured to run programs or instructions to implement each process of the embodiment of the foregoing method in FIG. 4 or FIG. 5 and the same technical effects can be achieved. To avoid repetition, details are not described herein again.

It should be understood that the chip mentioned in this embodiment of this application may also be referred to as a system-level chip, a system chip, a chip system, or an on-chip system chip.

The embodiment of the present application further provides a communication device, configured to execute each process of the above method embodiment in FIG. 4 or FIG. 5, and can achieve the same technical effect. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

Embodiments of this application are described above with reference to the accompanying drawings, but this application is not limited to the foregoing implementations. The foregoing embodiments are only illustrative rather than restrictive. Inspired by this application, a person of ordinary skill in the art can still derive many variations without departing from the essence of this application and the protection scope of the claims. All these variations shall fall within the protection of this application.

What is claimed is:

1. An interference processing method, comprising:

sending, by a first integrated access backhaul (IAB) node, first indication information to a second IAB node, wherein the first indication information is used to indicate beam usage restriction of the second IAB node, the first indication information comprises restriction information, the restriction information comprises first information of a distribution unit (DU) of the second IAB node, and the first information is used to determine a restricted beam.

2. The method according to claim 1, wherein the beam usage restriction indicated by the first indication information comprises a prohibited first beam.

3. The method according to claim 1, wherein the first indication information comprises N pieces of restriction information, the N pieces of restriction information correspond to N beam usage restrictions, and N is a positive integer.

4. The method according to claim 1, wherein the first information comprises at least one of the following: SSB index; or channel state information-reference signal resource indicator (CRI).

5. The method according to claim 1, wherein a usage time domain range of the restriction information satisfies that the usage time domain range comprises a potential simultaneous transmission moment of the DU of the second IAB node and a mobile terminal (MT) of the second IAB node.

6. The method according to claim 1, wherein the method further comprises:

sending, by the first IAB node, second indication information to the second IAB node, wherein the second indication information is used for activating at least one piece of restriction information.

7. The method according to claim 6, wherein the second indication information comprises a first sounding reference signal resource indicator (SRI), wherein the first SRI is associated with the first restriction information.

8. An interference processing method, comprising:

receiving, by a second IAB node, first indication information sent by a first IAB node, wherein the first indication information is used to indicate beam usage restriction of the second IAB node, the first indication information comprises restriction information, the restriction information comprises first information of a DU of the second IAB node, and the first information is used to determine a restricted beam; and performing, by the second IAB node, a third operation related to a downlink transmission beam of a DU of the second IAB node according to the first indication information.

9. The method according to claim 8, wherein the beam usage restriction indicated by the first indication information comprises a prohibited first beam or, wherein the first indication information comprises N pieces of restriction information, the N pieces of restriction information correspond to N beam usage restrictions, and N is a positive integer.

10. The method according to claim 9, wherein the third operation comprises at least one of the following:

giving up using the first beam; and using the second beam according to a first transmit power, wherein the first transmit power is determined based on a power restriction.

11. The method according to claim 8, wherein the method further comprises:

receiving, by the second IAB node, second indication information sent by the first IAB node, wherein the second indication information is used for activating at least one piece of restriction information or, a usage time domain range of the restriction information satisfies that the usage time domain range comprises a potential simultaneous transmission moment of the DU of the second IAB node and a mobile terminal (MT) of the second IAB node.

12. The method according to claim 11, wherein the method further comprises:

in a case that the MT of the second IAB node does not send an uplink signal at the potential simultaneous transmission moment, sending, by the DU of the second IAB node, a downlink signal, wherein transmission of the downlink signal is not related to the restriction information.

13. The method according to claim 8, wherein the first information comprises at least one of the following: SSB index; or channel state information-reference signal resource indicator (CRI).

14. The method according to claim 13, wherein the second indication information comprises a first sounding reference signal resource indicator (SRI), wherein the first SRI is associated with the first restriction information.

15. An IAB node, the IAB node being a first IAB node, comprising: a processor, a memory, and a program or an instruction stored in the memory and capable of running on the processor, wherein when the program or instruction is executed by the processor, the following steps are implemented:

sending, by the first IAB node, first indication information to a second IAB node, wherein the first indication information is used to indicate beam usage restriction of the second IAB node, the first indication information comprises restriction information, the restriction information comprises first information of a distribution unit (DU) of the second IAB node, and the first information is used to determine a restricted beam.

16. An IAB node, the IAB node being a second IAB node, comprising: a processor, a memory, and a program or an instruction stored in the memory and capable of running on the processor, wherein when the program or instruction is executed by the processor, the steps of the interference processing method according to claim 8 are implemented.

17. The IAB node according to claim 15, wherein the beam usage restriction indicated by the first indication information comprises a prohibited first beam.

18. The IAB node according to claim 15, wherein the first indication information comprises N pieces of restriction information, the N pieces of restriction information correspond to N beam usage restrictions, and N is a positive integer.

19. The IAB node according to claim 15, wherein the first information comprises at least one of the following: SSB index; or channel state information-reference signal resource indicator (CRI).

20. The IAB node according to claim 15, wherein a usage time domain range of the restriction information satisfies that the usage time domain range comprises a potential simultaneous transmission moment of the DU of the second IAB node and a MT of the second IAB node.

* * * * *